(12) United States Patent
Kedia et al.

(10) Patent No.: US 7,725,748 B1
(45) Date of Patent: May 25, 2010

(54) LOW POWER SUBSYSTEM FOR PORTABLE COMPUTERS

(75) Inventors: Pankaj Kedia, Palo Alto, CA (US); James Kardach, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 970 days.

(21) Appl. No.: 09/753,326

(22) Filed: Dec. 29, 2000

(51) Int. Cl.
G06F 1/32 (2006.01)
(52) U.S. Cl. ...................... 713/323; 713/320
(58) Field of Classification Search .......... 713/320, 713/323
See application file for complete search history.

(56) References Cited

U.S. PATENT DOCUMENTS

| | | | |
|---|---|---|---|
| 4,497,021 A * | 1/1985 | Fukuda et al. ............ | 712/43 |
| 4,775,928 A | 10/1988 | Kendall | |
| 5,142,684 A | 8/1992 | Perry | |
| 5,155,828 A | 10/1992 | La Fetra | |
| 5,251,299 A | 10/1993 | Masuda | |
| 5,283,883 A | 2/1994 | Mishler | |
| 5,287,485 A * | 2/1994 | Umina et al. ............ | 711/120 |
| 5,392,390 A | 2/1995 | Crozier | |
| 5,432,462 A | 7/1995 | Obregon | |
| 5,446,906 A | 8/1995 | Kardach | |
| 5,465,367 A | 11/1995 | Reddy | |
| 5,471,621 A | 11/1995 | Ohtsuki | |
| 5,490,279 A | 2/1996 | Golbert | |
| 5,530,879 A | 6/1996 | Crump | |
| 5,560,001 A | 9/1996 | Kardach | |
| 5,590,197 A * | 12/1996 | Chen et al. ............. | 705/65 |
| 5,655,127 A | 8/1997 | Rabe | |
| 5,657,483 A | 8/1997 | Kardach | |
| 5,666,537 A | 9/1997 | Debnath | |
| 5,692,202 A | 11/1997 | Kardach | |
| 5,768,164 A * | 6/1998 | Hollon, Jr. ............. | 708/174 |
| 5,768,686 A | 6/1998 | Lablanc | |
| 5,809,314 A | 9/1998 | Carmean | |
| 5,818,425 A | 10/1998 | Want | |
| 5,832,489 A | 11/1998 | Kucala | |
| 5,860,016 A | 1/1999 | Nookala | |
| 5,884,088 A | 3/1999 | Kardach | |
| 5,887,254 A | 3/1999 | Halonen | |
| 5,906,657 A | 5/1999 | Tognazzini | |
| 5,920,728 A | 7/1999 | Hallowell | |
| 5,926,623 A | 7/1999 | Tsukakoshi | |
| 5,936,442 A | 8/1999 | Liu | |

(Continued)

FOREIGN PATENT DOCUMENTS

DE 100 23 163 A1 11/2001

(Continued)

OTHER PUBLICATIONS

English Abstract for DE 100 23 163, Nov. 15, 2001.

(Continued)

*Primary Examiner*—Tse Chen
(74) *Attorney, Agent, or Firm*—Blakely, Sokoloff, Taylor & Zafman LLP

(57) ABSTRACT

An embedded subsystem is coupled to a shared database is synchronized with the notebook and has access to the hard drive. The subsystem is in operation when the notebook is in low power mode.

28 Claims, 3 Drawing Sheets

U.S. PATENT DOCUMENTS

| | | | |
|---|---|---|---|
| 5,952,638 A | 9/1999 | Demers | |
| 5,959,833 A | 9/1999 | Youens | |
| 5,982,520 A | 11/1999 | Weiser | |
| 5,983,073 A * | 11/1999 | Ditzik | 455/11.1 |
| 5,983,186 A * | 11/1999 | Miyazawa et al. | 704/275 |
| 6,006,285 A | 12/1999 | Jacobs | |
| 6,014,751 A | 1/2000 | Kardach | |
| 6,035,408 A | 3/2000 | Huang | |
| 6,038,642 A | 3/2000 | Arimilli | |
| 6,044,473 A * | 3/2000 | Kim | 713/320 |
| 6,047,260 A | 4/2000 | Levinson | |
| 6,052,792 A | 4/2000 | Mensch, Jr. | |
| 6,065,121 A | 5/2000 | Hobson, Jr. | |
| 6,085,330 A | 7/2000 | Hewitt, Jr. | |
| 6,088,809 A | 7/2000 | Atkinson | |
| 6,098,175 A | 8/2000 | Lee | |
| 6,108,663 A * | 8/2000 | Kableshkov | 707/102 |
| 6,131,166 A | 10/2000 | Wong-Insley | |
| 6,185,535 B1 | 2/2001 | Hedin | |
| 6,208,996 B1 | 3/2001 | Ben-Shachar | |
| 6,209,011 B1 | 3/2001 | Vong | |
| 6,219,694 B1 | 4/2001 | Lazaridis | |
| 6,222,507 B1 | 4/2001 | Gouko | |
| 6,240,521 B1 * | 5/2001 | Barber et al. | 713/323 |
| 6,266,295 B1 | 7/2001 | Parker | |
| 6,289,464 B1 | 9/2001 | Wecker | |
| 6,314,491 B1 | 11/2001 | Freerksen | |
| 6,334,046 B1 | 12/2001 | Philipson | |
| 6,339,795 B1 | 1/2002 | Narurkar | |
| 6,341,354 B1 | 1/2002 | Lee | |
| 6,349,386 B1 | 2/2002 | Chan | |
| 6,353,927 B1 | 3/2002 | Ali | |
| 6,356,956 B1 | 3/2002 | Deo | |
| 6,360,237 B1 | 3/2002 | Hobson | |
| 6,367,074 B1 | 4/2002 | Bates | |
| 6,385,734 B2 | 5/2002 | Atkinson | |
| 6,412,075 B1 | 6/2002 | Klein | |
| 6,412,689 B1 | 7/2002 | Horiguchi | |
| 6,421,754 B1 | 7/2002 | Kau | |
| 6,424,249 B1 | 7/2002 | Houvener | |
| 6,445,730 B1 | 9/2002 | Greszczuk | |
| 6,456,938 B1 | 9/2002 | Barnard | |
| 6,477,655 B1 | 11/2002 | Delvaux | |
| 6,496,949 B1 | 12/2002 | Kanevsky | |
| 6,501,999 B1 | 12/2002 | Cai | |
| 6,502,003 B1 | 12/2002 | Jacobs | |
| 6,535,985 B1 | 3/2003 | Oshima | |
| 6,571,281 B1 | 5/2003 | Nickerson | |
| 6,594,632 B1 | 7/2003 | White | |
| 6,600,734 B1 | 7/2003 | Gernert | |
| 6,631,474 B1 | 10/2003 | Cai | |
| 6,654,827 B2 | 11/2003 | Zhang | |
| 6,658,576 B1 | 12/2003 | Lee | |
| 6,675,233 B1 | 1/2004 | Du | |
| 6,675,304 B1 | 1/2004 | Pole, II | |
| 6,678,831 B1 | 1/2004 | Mustafa | |
| 6,693,897 B1 | 2/2004 | Huang | |
| 6,697,953 B1 | 2/2004 | Collins | |
| 6,714,983 B1 | 3/2004 | Koenck | |
| 6,718,475 B2 | 4/2004 | Cai | |
| 6,725,060 B1 | 4/2004 | Chhatriwala | |
| 6,725,250 B1 | 4/2004 | Ellis, III | |
| 6,741,853 B1 | 5/2004 | Jiang | |
| 6,751,742 B1 | 6/2004 | Duhault | |
| 6,760,850 B1 | 7/2004 | Atkinson | |
| 6,785,786 B1 | 8/2004 | Gold | |
| 6,801,208 B2 | 10/2004 | Keshava | |
| 6,804,791 B2 | 10/2004 | Oshima | |
| 6,813,674 B1 | 11/2004 | Velasco | |
| 6,836,850 B2 | 12/2004 | Cheng | |
| 6,859,882 B2 | 2/2005 | Fung | |
| 6,895,448 B2 | 5/2005 | Chan | |
| 6,930,987 B1 | 8/2005 | Fukuda | |
| 7,058,829 B2 | 6/2006 | Hamilton | |
| 7,080,271 B2 | 7/2006 | Kardach | |
| 7,114,090 B2 | 9/2006 | Kardach | |
| 7,117,379 B2 | 10/2006 | Hamilton | |
| 7,254,730 B2 | 8/2007 | Kardach | |
| 7,406,610 B2 | 7/2008 | Kardach | |
| 7,421,597 B2 | 9/2008 | Kardach | |
| 7,428,650 B2 | 9/2008 | Kardach | |
| 2002/0011951 A1 | 1/2002 | Pepin | |
| 2002/0023237 A1 | 2/2002 | Yamada | |
| 2002/0032877 A1 | 3/2002 | Iwaki | |
| 2002/0068610 A1 | 6/2002 | Anvekar | |
| 2002/0085835 A1 | 7/2002 | Zhang | |
| 2002/0086719 A1 | 7/2002 | Kedia | |
| 2002/0132603 A1 | 9/2002 | Lindskog | |
| 2003/0018581 A1 | 1/2003 | Bratton | |
| 2003/0115415 A1 | 6/2003 | Want | |
| 2003/0208550 A1 | 11/2003 | Hamilton | |
| 2004/0073818 A1 | 4/2004 | Cheok | |
| 2006/0212733 A1 | 9/2006 | Hamilton | |
| 2007/0234339 A1 | 10/2007 | Kostadinov | |
| 2008/0196044 A1 | 8/2008 | Stanley | |
| 2009/0019185 A1 | 1/2009 | Kardach | |

FOREIGN PATENT DOCUMENTS

| | | |
|---|---|---|
| EP | 0 810 510 | 3/1997 |
| EP | 0 945 778 | 9/1999 |
| WO | WO 01/15159 | 3/2001 |
| WO | WO 01/61442 | 8/2001 |
| WO | WO 01/61872 | 8/2001 |

OTHER PUBLICATIONS

Korean Patent Abstract, Publication No. 10/2001/0016,060, Published Mar. 5, 2001, 1 page. cited by other.

Padwick et al, Using Microsoft Outlook 98, Que, 1998, pp. 40-44, 453-455, 540-541.

U.S. Appl. No. 09/450,261, filed Nov. 29, 1999, entitled "Automatically Enabling Information To Be Displayed After a Processor-Based System Is Turned Off", now abandoned.

Application No. 09/752,644, Filed Feb. 29, 2000, Office Action date mailed Nov. 28, 2003, 10 pages.

Application No. 09/752,644, Filed Feb. 29, 2000, Office Action date mailed Jul. 12, 2004, 13 pages.

Application No. 09/752,644, Filed Feb. 29, 2000, Office Action date mailed Mar. 1, 2005, 13 pages.

Application No. 09/752,644, Filed Feb. 29, 2000, Office Action date mailed Jun. 20, 2005, 15 pages.

Application No. 09/752,644, Filed Feb. 29, 2000, Office Action date mailed Dec. 20, 2005, 10 pages.

Application No. 09/752,644, Filed Feb. 29, 2000, Office Action date mailed Apr. 13, 2006, 13 pages.

Application No. 09/752,644, Filed Feb. 29, 2000, Office Action date mailed Oct. 23, 2006, 15 pages.

Application No. 09/752,644, Filed Feb. 29, 2000, Office Action date mailed Feb. 22, 2007, 14 pages.

* cited by examiner

LOW POWER SUBSYSTEM FOR PORTABLE COMPUTERS

BACKGROUND

The modern trend in electrical appliances is mobility. People want to be able to use an electrical device from where they are at that instant. They want to be able to call people from anyplace they happen to be, hence the cell phone. They want to be able to listen to their own music no matter where they are, hence the portable compact disc player. They also want to be able to use their computer from almost anywhere, hence the notebook computer. The current design of the notebook computer has made this difficult. Specifically, using a computer while the subject is moving is currently exceedingly awkward.

The difficulty is related to the current design of notebook computers. The limited life of notebook computer batteries only allows for the computer to be on for a limited time. Battery conservation techniques include running the notebook in a state in which the central processing unit (CPU) is not active to conserve energy. Full access and control of a notebook's functionality often requires it to be in the open position, where the display screen and keyboard are at a right angle from each other. This L-shaped position is more difficult to carry around than the closed position. These difficulties become even more apparent in efforts to use notebooks as a method to electronically purchase items in a store. A further difficulty is created when attempting to either listen to or view multimedia entertainment data while either moving about or in a confined area, such as an airplane.

DETAILED DESCRIPTION

A low-power subsystem for a portable computer, which operates while the computer is in a low-powered mode in which the CPU performs in a less active state, is disclosed. Normally, when the notebook computer is in low power mode (also called powered down mode) during which the CPU is in a less active state and the notebook display screen may be in the closed position, the data stored within the computer typically cannot be accessed. One embodiment described herein allows access to the data while the computer is low power mode by use of a low-power subsystem (LPS) in the computer with access to the same memory storage as the CPU. The subsystem acts independently of the CPU, which would not be able to perform the necessary functions during low power mode. The subsystem allows the notebook to perform several functions while in the low power mode, such as, for example, act like a travel assistant for the user, provide entertainment, and make electronic purchases.

A notebook will go into low power mode either when the user has left the notebook idle for a time period previously specified by the user, or when the user has closed the notebook. In one embodiment, the LPS is activated when the notebook enters low power mode, and remains active until the CPU is activated or until the computer system is turned off. In an alternate embodiment, the LPS would remain inactive until the user turns the LPS on and would remain on until the user deactivates the LPS, activates the CPU, or turns off the notebook.

Figure 1A:
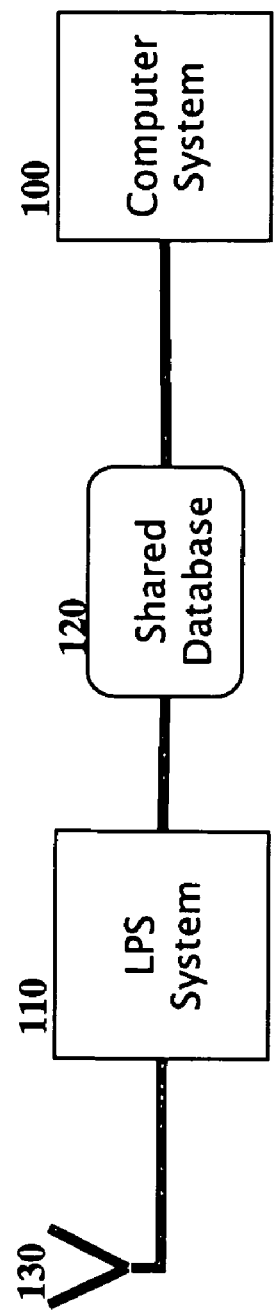
FIGS. 1a-b is a block diagram of the system according to one embodiment.

FIG. 1(a) illustrates an embodiment of a computer system in which a low-power subsystem 110 is coupled to a shared database 120. The shared database 120 is synchronized with the memory components of a computer system 100, allowing a user to access data stored in the notebook computer system through the LPS. In one embodiment the LPS is embedded in the computer system. In one embodiment, the subsystem is coupled to a wireless interface 130, by which the user can exchange data with the notebook and the notebook can exchange data with a network. The shared database 120 is in operation while the subsystem 110 is in operation.

Figure 1B:
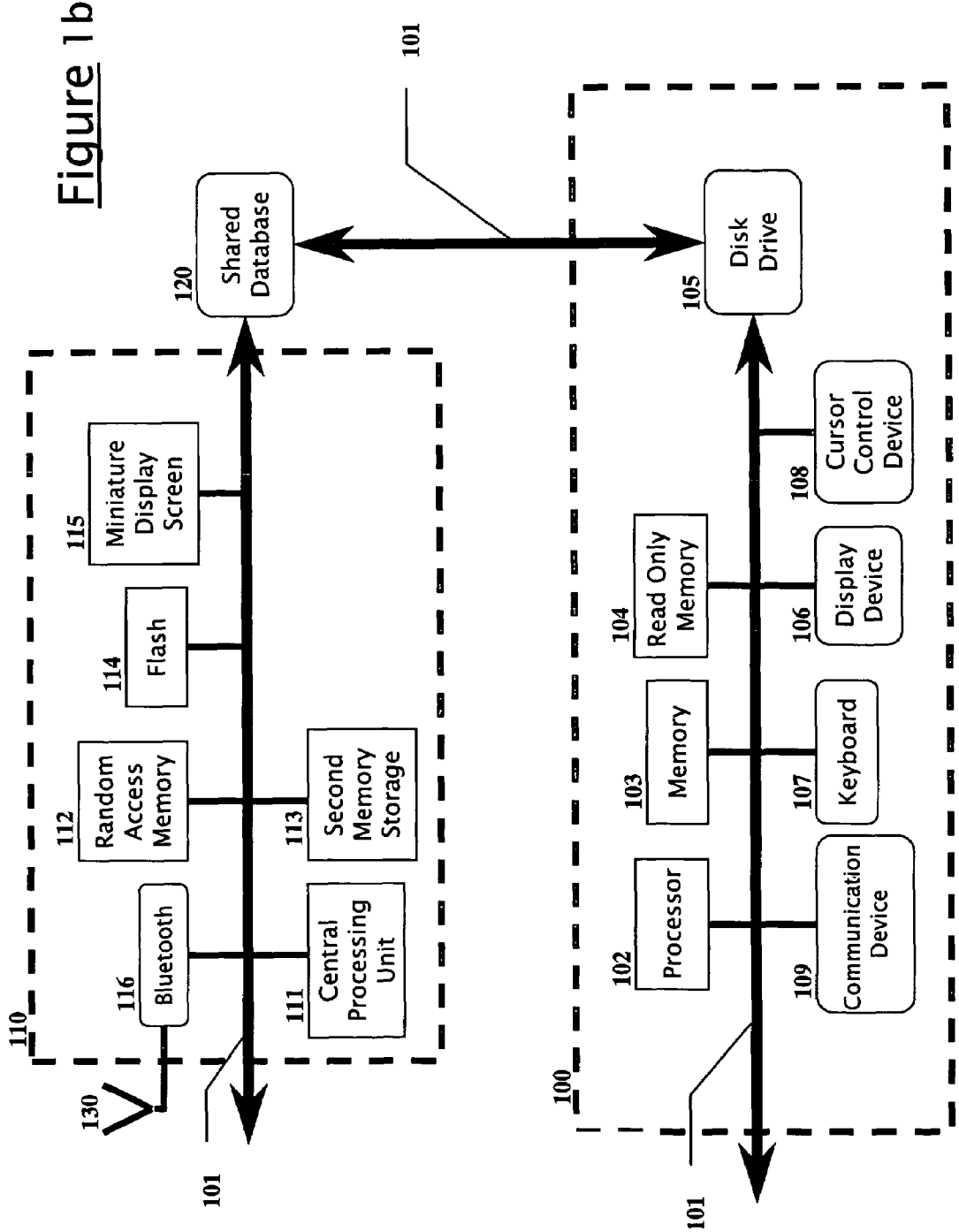

FIG. 1b shows a more detailed view of the architecture of the subsystem and of the computer system to which the subsystem is coupled. Computer system 100 includes a bus or other communications device 101 for communicating information, and a processing unit such as processor 102 coupled with bus 101 for processing information. Computer system 100 further includes a random access memory (RAM) or other dynamic storage device 103 (commonly referred to as memory), coupled to bus 101 for storing information and instructions to be executed by processor 102. Memory 103 also may be used for storing temporary variables or other intermediate information during execution of instructions by processor 102. Computer system 100 may also include a read only memory (ROM) and/or other static storage device 104 coupled to bus 101 for storing static information and instructions for processor 102. The memory and/or the ROM may be referred to herein as a storage device.

A disk drive 105 such as a magnetic disk or optical disk may also be coupled to computer system 100 for storing information and instructions. Computer system 100 can also be coupled via bus 101 to a display device 106, such as a cathode ray tube (CRT) or a liquid crystal display (LCD), for displaying information to a computer user. For example, image, textual, or graphical depictions of product data and other types of image, graphical, or textual information may be presented to the user on display device 106. Typically, an alphanumeric input device 107, including alphanumeric and other keys, is coupled to bus 101 for communicating information and/or command selections to processor 102. Another type of user input device is cursor control device 108, such as a conventional mouse, trackball, or other type of cursor direction keys for communicating direction information and command selection to processor 102 and for controlling cursor movement on display 106. A communications device 109, such as a modem, may also be coupled with the computer system. The shared database 120, in one embodiment, is coupled to the computer system 100 via the disk drive 105, as the disk drive 105 is the database's most frequent point of access.

An embodiment of the subsystem is also illustrated in detail in FIG. 1(b). In one embodiment, the low-power subsystem 110 includes a processor 111 and a random access memory (RAM) 112. In an alternative embodiment, the low-power embedded subsystem also contains secondary memory storage 113, to store frequently accessed information. In one embodiment, the low-power embedded subsystem may also include a Flash memory 114. In one embodiment, a miniature display screen 115 could be included in the LPS to display data when the main screen 106 of the notebook is closed. The low-power embedded subsystem, in an alternate embodiment, can further comprise a device to allow the interface 130 to be a wireless interface 116, such as Bluetooth®. The shared database 120 would allow the subsystem 110 to have access to the hard drive storage 109 device of the notebook 100. In alternative embodiments, the shared database 120 would also have access to other memory devices such as the memory 106 of the notebook 100 or the ROM 108.

The low-power subsystem 110 allows the notebook 100 to act as a personal server. In one embodiment, the notebook could act as a travel assistant. The notebook, in the closed powered down position, would be kept in a traveling case. As the notebook would be in low power mode, there would be less drain on the battery. In one embodiment, the shared database 120 would have access to the travel information contained in the hard drive 105, the memory 103, or the ROM 104. In a further embodiment, the shared database may access a variety of data, including, for example, memos, maps, calendars, and/or other information helpful for traveling. The information could be presented over headphones or as visual display on a miniature display screen 115. In one embodiment, the data could be sent over the wireless interface 130 to the user's cellular phone. In a further embodiment, the low-power subsystem can use the cellular phone to access a network.

In an alternate embodiment, the notebook acts as a multimedia center for the user. The notebook could store multimedia data on the notebook's hard drive 105 or access the multimedia data from a network. The multimedia data is then accessed by the low-power subsystem 110 through the shared database 120. It can then be presented to the user over headphones or displayed over a miniature display screen 115.

In an alternate embodiment, the user can use the wireless interface with the notebook to make electronic purchases at a store set up for electronic purchases. The wireless interface of the notebook, operating off the low-power subsystem at low power, sends a signal from the user to a server at the store to indicate interest in purchasing an item. In one embodiment, the item purchased is electronic data, such as a video or an MP3 file. That data is then sent to the user's notebook over the wireless interface, and the user is charged accordingly. The user can then store the data on the hard drive or on the shared database and listen to or view the data later while the notebook is in low power mode.

Figure 2:
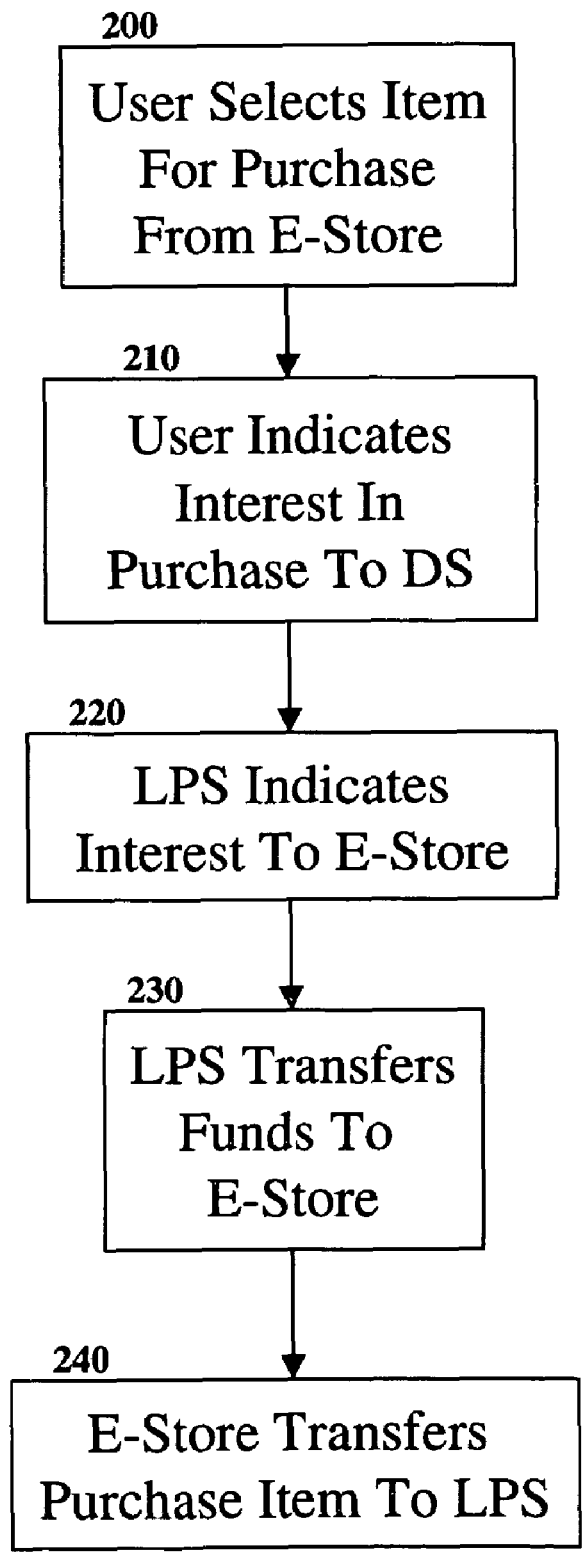
FIG. 2 is a flowchart describing steps of using verbal commands with a computer system according to one embodiment.

An embodiment of this method of purchasing data at an electronic store is illustrated by the flowchart in FIG. 2. First, the user selects an item for purchase, such as a multimedia (e.g. a video or MP3), from an electronic store, or e-store 200. The user then indicates his interest in purchasing the item, possibly via a voice command, to the low-power subsystem (LPS) 210. The low-power subsystem then communicates to the e-store that the user wishes to purchase the selected item 220. The low-power subsystem then transfers the necessary funds to the e-store 230. The e-store transfers the purchase item electronically over the wireless interface to the low-power subsystem 240.

The method described above can be stored in the memory of a computer system (e.g., set top box, video recorders, etc.) as a set of instructions to be executed. In addition, the instructions to perform the method described above could alternatively be stored on other forms of machine-readable media, including magnetic and optical disks. For example, the method of the present invention could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the methods as discussed above, could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
   transitioning a central processing unit (CPU) of a computer system into a low power mode, the computer system having a memory,
   activating a low power subsystem when the CPU enters the low power mode, the low-power subsystem including a low power processor, an external interface and a low power memory;
   independent of the CPU, using the low power processor of the low power subsystem to access data contained within the computer system memory; and
   providing the accessed data through the external interface of the low-power subsystem.

2. The method of claim 1, wherein accessing data comprises accessing data through a shared database of the low-power subsystem, the method further comprising storing at least a partial copy of data accessed from the computer system memory in the shared database.

3. The method of claim 1, wherein accessing data contained within the computer system memory comprises accessing data contained within a disk drive unit.

4. The method of claim 3, wherein the data contained in the shared database includes multimedia data.

5. The method of claim 1, further comprising accessing data from a network via the external interface of the low-power subsystem.

6. The method of claim 5, wherein accessing data from the network comprises accessing data from the network using a wireless interface.

7. The method of claim 5, wherein accessing data from the network comprises accessing data from an electronic store allowing an electronic purchase.

8. The method of claim 1, wherein providing the accessed data through the external interface comprises presenting the data accessed to a user via a display of the external interface of the low-power subsystem.

9. The method of claim 1, wherein providing the accessed data through the external interface comprises presenting the data accessed to a user via an audio medium of the external interface of the low-power subsystem.

10. An apparatus comprising:
    a computer system having a central processing unit, a system memory, a mass storage device, and a user interface, the computer system having a low-power mode; and
    a low-power subsystem in operation when the computer system enters the low-power mode, the low power subsystem having a low power processor, a low power subsystem memory and an external interface independent of the computer system, the low power processor providing access to the computer system when the computer system is in the low power mode and the external interface providing data accessed from the computer system externally.

11. The apparatus of claim 10, further comprising a shared database coupled to the computer system and to the low-power subsystem and wherein the low power processes accesses the computer system through the shared database.

12. The apparatus of claim 11, wherein the computer system memory comprises a random access memory coupled to the central processing unit, and wherein the computer system mass storage device comprises a disk drive unit coupled to the central processing unit.

13. The apparatus of claim 12, wherein the shared database is coupled to the disk drive unit, the shared database to store at least a partial copy of data stored on the disk drive unit.

14. The apparatus of claim 11, wherein data contained within the shared database includes multimedia data.

15. The apparatus of claim 10, wherein the low-power subsystem external interface comprises a wireless interface to connect with a local area network.

16. The apparatus of claim 11, wherein the low power subsystem external interface comprises a video display to display data from the shared database.

17. The apparatus of claim 10, wherein the external interface of the low-power subsystem further comprises a wireless user interface to receive verbal commands from a user.

18. The apparatus of claim 17, wherein the wireless user interface further comprises an audio headset to receive audio data transmitted from the wireless user interface.

19. The apparatus of claim 10, wherein the low-power subsystem external interface further comprises an interface to transmit data to a cellular phone.

20. The apparatus of claim 10, wherein the computer system comprises a main screen and the low-power subsystem comprises a miniature display screen and wherein the low-power subsystem including the miniature display screen is activated when the main screen is closed.

21. The apparatus of claim 10, wherein the computer system comprises stored multimedia data, wherein the low-power subsystem accesses the stored multimedia data and wherein the low-power subsystem presents the multimedia data to a user through the external interface.

22. The apparatus of claim 21, wherein the low-power subsystem presents the multimedia data to the user over a miniature display screen of the external interface.

23. A low-power subsystem comprising:
a miniature display screen;
a user input unit;
a low-power subsystem memory; and
a low-power processor coupled to the miniature display screen, to the user input unit, and to the memory, the low-power processor providing access for the miniature display screen and the user input unit to a connected computer system when the connected computer system is in a low-power mode.

24. The low-power subsystem of claim 23 wherein the processor provides access to the computer system through a shared database, the shared database being a part of the low-power subsystem.

25. The low-power subsystem of claim 24, wherein the shared database is coupled to the computer system to store at least a partial copy of data stored in the computer system.

26. The low-power subsystem of claim 23, further comprising a wireless interface to connect to an external network.

27. The low-power subsystem of claim 23, further comprising a wireless interface to connect the user input unit and the processor.

28. The low-power subsystem of claim 23 wherein the user input unit comprises a wireless user interface to receive verbal commands from a user.

* * * * *